April 7, 1970  D. G. TAYLOR  3,504,554
VIBRATING WIRE ANGULAR RATE SENSOR
Filed Nov. 16, 1967
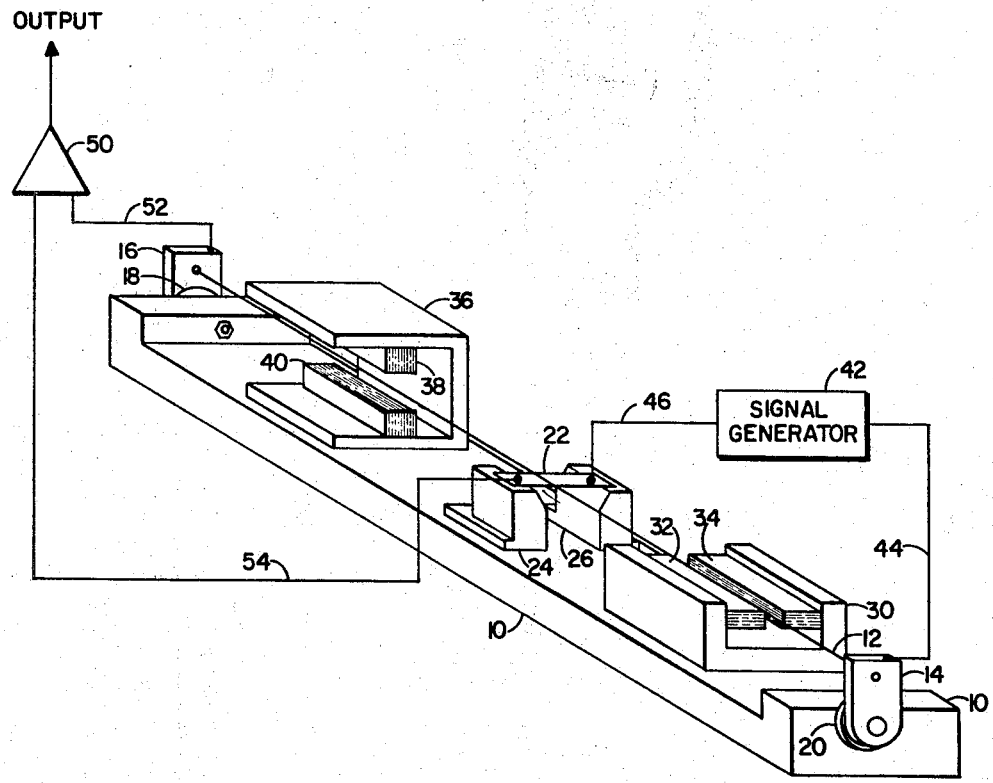
INVENTOR.
DANIEL G. TAYLOR
BY Charles J. Ungemach
ATTORNEY

United States Patent Office 3,504,554
Patented Apr. 7, 1970

3,504,554
VIBRATING WIRE ANGULAR RATE SENSOR
Daniel G. Taylor, Minneapolis, Minn., assignor to Honeywell Inc., Minneapolis, Minn., a corporation of Delaware
Filed Nov. 16, 1967, Ser. No. 683,561
Int. Cl. G01p 3/48
U.S. Cl. 73—505
3 Claims

ABSTRACT OF THE DISCLOSURE

A vibrating wire gyroscope in which the nodal point at the center of the wire is located by a metal tape so as to permit the wire to vibrate in substantially one plane only.

BACKGROUND OF THE INVENTION

The present invention relates to angular rate sensors and more particularly to the improvement of a vibrating wire type of angular rate sensor such as shown in co-pending applications Ser. No. 567,760, in the name of Daniel G. Taylor and Ser. No. 575,723, in the name of Robert H. Grangroth both assigned to the present assignee.

The prior art devices as shown in the above copending applications comprise a support member upon which is stretched a taut wire. The wire is further mounted by a flexible or pivoting mount near the center so as to divide the wire into two dynamically coupled portions. Magnetic forces are used to vibrate one portion of the wire in a planar mode. This vibration passes over the center support so that the second portion of the wire vibrates also. by placing the second portion in a magnetic field, its movement or vibration produces a current flow in the second portion which may be measured as an indication of the wire's orientation. The vibrating wire will tend to continue to vibrate in a single inertial plane. This basic phenomena is the result of the same inertial forces which tend to stabilize a spinning wheel. Thus, if the support member is rotated about an axis which is generally parallel and along the wire, the vibrating wire will resist the rotation and the relative change in position of the wire may be monitored and the rotational rate measured.

One undesirable side effect of the aforementioned device arises from the vibration characteristics of the wire. Despite the fact that the driving magnetic forces operate to vibrate the wire in a predetermined plane, a transverse vibration orthogonal to the desired vibration will develop so that the resultant vibration of the wire is eliptical in nature, thus, decreasing the accuracy of the device. The present invention contemplates an improvement in the design so as to suppress these unwanted transverse vibrations.

SUMMARY OF THE INVENTION

Briefly, instead of positioning a flexible wire at the center of the wire as disclosed in the above-referenced copending applications a flat metal tape is positioned at the center so as to detune the wire transversely but not affect the natural vibrations in the driven plane. It has been found that a flat tape correctly positioned will not seriously hinder vibrations in the predetermined plane which are caused by magnetic forces but will eliminate the undesirable transverse vibrations. In addition, a tape' has less electrical resistance and is easier to locate in production. Accordingly, it is an object of the present invention to provide improved control apparatus. It is a further object of my invention to provide a vibrating wire type of angular rate sensor in which undesirable vibrations are tuned out so that only the predetermined vibration can exist. Further objects and advantages will become evident with reference to the accompanying detailed description and drawing.

BRIEF DESCRIPTION OF THE DRAWING

In the drawing a perspective view of a preferred embodiment of my invention is schematically shown.

DESCRIPTION OF THE PREFERRED EMBODIMENT

In the drawing, a support member 10 is shown upon which is mounted a taut wire 12. Wire 12 is fastened to a pair of metal tabs 14 and 16 which are mounted to support member 10. A pair of small washers 18 and 20 serve to insulate tabs 14 and 16 from support member 10. Wire 12 is further mounted by means of a flat metal tape 22, which is in turn supported by a pair of tabs 24 and 26. Tabs 24 and 26 are affixed to support member 10. Tape 22 is torsionally very stiff in the horizontal plane and serves to limit the vibrations of wire 12 in the plane in which tape 22 lies. However, tape 22 will twist about the axis connecting tabs 24 and 26 so as to provide a resilient or flexible mount for vertical vibrations of wire 12. Thus, a nodal point is created at the center of wire 12, and any vibrations in one portion of the wire will generate identical but opposite phased fluctuations in the other portion of the wire. That is to say, vertical wave motion in wire 12 may travel across the flexible nodal mounting at tape 22.

Wire 12 is driven by a signal generator 42 and a pair of magnets 32 and 34 which are supported on each side of wire 12 by means of a mounting bracket 30. The lines of force from magnets 32 and 34 are substantially perpendicular to wire 12. In a like manner, a bracket 36 positions a pair of magnets 38 and 40 so as to produce a magnetic field whose lines of force are perpendicular to the second portion of the wire and also orthogonal to the lines of force of the magnets 32 and 34. Signal generator 42 causes an alternating current to flow in the first portion of wire 12 between magnets 32 and 34. Suitable electrical connections are made by means of a pair of leads 44 and 46 which connect to wire 12 through tape 22 and tab 14. Signal generator 42 provides an alternating drive current at approximately the same frequency as the natural resonant frequency of the wire. The flow of current along the wire through the horizontal perpendicular magnetic field from magnets 32 and 34 will cause the first portion of wire 12 to vibrate or oscillate in a vertical plane. These vibrations will be transmitted across the flexible tape 22 into the second portion of wire 12 so that the second portion of wire 12 will also oscillate in a vertical plane. Since the magnetic field from magnets 38 and 40 is in a vertical direction, the oscillations of wire 12 do not cross or break any of the lines of force. Consequently, as is well known to those skilled in the art, no current is generated in the second portion of wire 12. An amplifier 50 is connected to this portion of wire 12 by means of leads 52 and 54. If support member 10 is rotated about an axis generally along the wire 12, bracket 36, and magnets 38 and 40 will rotate with support member 10. However, due to the inertial qualities of wire 12, it will attempt to continue to oscillate in the same vertical plane as before. Thus, wire 12 will start cutting the magnetic lines of force from magnets 38 and 40 and an oscillating signal will be presented to amplifier 50 whose output is proportional to the inclination of the vibration plane with respect to the lines of force from magnets 38 and 40. The phase of the signal presented to amplifier 50 will be representative of the direction of rotation. A more detailed analysis of the operation to this point may be had by reference to the aforementioned copending application in the name of Daniel G. Taylor.

In the prior art device a crosswise wire is mounted at the center of wire 12 as disclosed by the above-referenced copending application. In that configuration wire 12 not only oscillates in the plane in which it is driven but also in various other transverse modes so that the output signal presented to amplifier 50 does not have the best signal to noise ratio. However, in the present invention, the flat metal tape flexes freely only for the vertical vibrations so that the only vibration that can be sustained in wire 12 will be that which is forced by the drive means, namely, signal generator 42.

It should be understood that many variations may be made to my invention without departing from the novel concept disclosed. Therefore, I do not intend to limit the invention to the embodiments shown except as defined in the appended claims.

I claim.

1. An angular rate sensor comprising in combination: support means having an axis of rotation; an electrically conducting wire supported at both ends by said support means, generally along said axis of rotation, under tension, and also flexibly mounted at the center by means of a flat metal tape so that the wire has first and second dynamically coupled portions which portions have a preferred plane of vibration; means for vibrating the first portion in the preferred plane; means for generating a magnetic field through the second portion in a direction such that no lines of force of the magnetic field are crossed by the wire when it vibrates in said preferred plane and the apparatus is stationary; and output means connected to only said second portion and adapted to measure the current flow therein.

2. The apparatus of claim 1 in which said vibrating means comprises means for producing a magnetic field across said first portion perpendicular to said plane of vibration and means for causing an alternating current to flow in said first portion.

3. An angular rate sensor comprising in combination: support means having an axis of rotation; an electrically conducting wire support at both ends by said support means, generally along said axis of rotation, under tension, and also flexibly mounted at the center by means of a flat metal tape so that the wire has first and second dynamically coupled portions which portions have a preferred plane of vibration; first generating means affixed to said support means for generating a first magnetic field with lines of force which are substantially perpendicular to said first portion and substantially perpendicular to the preferred plane of vibartion; second generating means affixed to said support means for generating a second magnetic field with lines of force which are substantially perpendicular to said second portion and also orthogonal to the lines of force of said first magnetic field; current producing means for causing alternating current to flow in only said first portion; and means connected to only said second portion responsive to current flowing therein, which current is indicative in magnitude of the rotational rate of said support about said axis of rotation and indicative in phase of the direction of rotation.

References Cited

UNITED STATES PATENTS

| | | | |
|---|---|---|---|
| 3,316,768 | 5/1967 | Cook | 73—505 |
| 2,974,530 | 3/1961 | Jaoven | 73—505 |
| 2,546,158 | 3/1951 | Johnson | 73—505 |

JAMES J. GILL, Primary Examiner

H. GOLDSTEIN, Assistant Examiner